US008732040B1

(12) United States Patent
Prabhune et al.

(10) Patent No.: US 8,732,040 B1
(45) Date of Patent: May 20, 2014

(54) TARGET INVENTORY DETERMINATION BASED ON HOSTED MERCHANTS PRESENCE

(75) Inventors: Aniket Ajit Prabhune, Mercer Island, WA (US); Pierre-Francois Seri, Redmond, WA (US); Ashish Agiwal, Seattle, WA (US); Jason W. Murray, Bellevue, WA (US); Devesh Mishra, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 47 days.

(21) Appl. No.: 13/211,158

(22) Filed: Aug. 16, 2011

(51) Int. Cl.
G06Q 10/00 (2012.01)
G06Q 10/08 (2012.01)
G06Q 20/20 (2012.01)

(52) U.S. Cl.
CPC ............ G06Q 10/087 (2013.01); G06Q 20/203 (2013.01)
USPC .............................................. 705/28; 705/22

(58) Field of Classification Search
None
See application file for complete search history.

(56) References Cited

U.S. PATENT DOCUMENTS

| | | | |
|---|---|---|---|
| 5,963,919 A | 10/1999 | Brinkley et al. |
| 6,341,269 B1 | 1/2002 | Dulaney et al. |
| 6,834,266 B2 | 12/2004 | Kumar et al. |
| 6,976,001 B1 | 12/2005 | Levanoni et al. |
| 7,236,949 B2 | 6/2007 | Natan et al. |
| 7,313,532 B2 | 12/2007 | Mariamova et al. |
| 7,437,308 B2 | 10/2008 | Kumar et al. |
| 7,437,323 B1 | 10/2008 | Valkov et al. |
| 7,676,404 B2 | 3/2010 | Richard et al. |
| 8,055,520 B2 | 11/2011 | Baumann et al. |
| 2001/0047293 A1 | 11/2001 | Waller et al. |
| 2002/0019759 A1 | 2/2002 | Arunapuram et al. |
| 2002/0072988 A1 | 6/2002 | Aram |
| 2002/0178077 A1 | 11/2002 | Katz et al. |
| 2003/0009410 A1 | 1/2003 | Ramankutty et al. |
| 2003/0018513 A1 | 1/2003 | Hoffman et al. |
| 2003/0033179 A1 | 2/2003 | Katz et al. |
| 2003/0074251 A1 | 4/2003 | Kumar et al. |
| 2003/0078850 A1 | 4/2003 | Hartman et al. |
| 2003/0101107 A1 | 5/2003 | Agarwal et al. |
| 2003/0149578 A1 | 8/2003 | Wong |
| 2003/0195791 A1 | 10/2003 | Waller et al. |
| 2003/0216969 A1 | 11/2003 | Bauer et al. |
| 2004/0039664 A1 | 2/2004 | Natan et al. |
| 2004/0172321 A1 | 9/2004 | Vemula et al. |

(Continued)

OTHER PUBLICATIONS

U.S. Appl. No. 13/172,726, filed Jun. 29, 2011, Jason W. Murray, et al.

(Continued)

Primary Examiner — Ryan Zeender
Assistant Examiner — Denisse Ortiz Roman
(74) Attorney, Agent, or Firm — Robert C. Kowert; Meyertons, Hood, Kivlin, Kowert & Goetzel, P.C.

(57) ABSTRACT

Methods and systems for inventory planning are described. An inventory reduction factor for an entity, based at least in part on an estimated ability of hosted merchants to fulfill demand for an item, may be determined. An adjusted target inventory estimate may be calculated using the determined inventory reduction factor and a target inventory quantity. The hosted merchants may be merchants offering the item for sale via a sales channel through which the entity also offers the item. The hosted merchants may in some cases be merchants offering the item for sale via the entity's website.

21 Claims, 9 Drawing Sheets

(56) References Cited

U.S. PATENT DOCUMENTS

| | | | |
|---|---|---|---|
| 2004/0172341 A1 | 9/2004 | Aoyama et al. | |
| 2005/0033706 A1 | 2/2005 | Krikler et al. | |
| 2006/0282346 A1 | 12/2006 | Kernodle et al. | |
| 2007/0143157 A1 | 6/2007 | Sussman et al. | |
| 2007/0270990 A1 | 11/2007 | Katircioglu | |
| 2008/0147486 A1 | 6/2008 | Wu | |
| 2009/0125385 A1 | 5/2009 | Landvater | |
| 2009/0187468 A1 | 7/2009 | Krech | |
| 2009/0240544 A1 | 9/2009 | Cheng et al. | |
| 2010/0138273 A1 | 6/2010 | Bateni et al. | |
| 2010/0205039 A1 | 8/2010 | Basak et al. | |
| 2010/0312611 A1* | 12/2010 | Henderson et al. | 705/10 |
| 2012/0054076 A1 | 3/2012 | Wu et al. | |
| 2012/0173304 A1 | 7/2012 | Hosoda et al. | |

OTHER PUBLICATIONS

U.S. Appl. No. 13/172,720, filed Jun. 29, 2011, Jason W. Murray.
U.S. Appl. No. 12/981,382, filed Dec. 29, 2010, Maomao Chen, et al.
U.S. Appl. No. 13/172,728, filed Jun. 29, 2011, Jason W. Murray, et al.
U.S. Appl. No. 13/524,897, Jun. 15, 2012, Fedor Zhdanov, et al.
U.S. Appl. No. 13/172,733, Jun. 29, 2011, Eric M. Mack, et al.
Benjamin W. Wah and Tao Wang, "Simulated Annealing with Asymptotic Convergence for Nonlinear Constrained Global Optimization," 2004, 15 pages.
Benjamin W. Wah, et al., "Hybrid Constrained Simulated Annealing and Genetic Algorithms for Nonlinear Constrained Optimization," 2001, 8 pages.
Benjamin W. Wah, et al., "The Theory of Discrete Lagrange Multipliers for Nonlinear Discrete Optimization," Research supported by National Science Foundation Grant NSF MIP 96-32316. Principles and Practice of Constraint Programming, Springer-Verlag, Oct. 1999, pp. 28-42.
Benjamin W. Wah, et al., "Constrained Genetic Algorithms and their Applications in Nonlinear Constrained Optimization," Proc. 12th International Conference on Tools with Articial Intelligence, Nov. 2000, 8 pages.
Benjamin W. Wah, et al., "Simulated annealing with asymptotic convergence for nonlinear constrained optimization," Received: Aug. 20, 2005 / Accepted: Oct. 16, 2006, © Springer Science+Business Media B.V. 2006, 37 pages.
Zhe Wu, "The Theory and Applications of Discrete Constrained Optimization Using Lagrange Multipliers," 221 pages, 2000.

* cited by examiner

TARGET INVENTORY DETERMINATION BASED ON HOSTED MERCHANTS PRESENCE

BACKGROUND

To provide a wide selection of products that are readily available for delivery, many merchants (whether engaging in electronic or conventional "brick and mortar" commerce) may store those products in warehouses, fulfillment centers, or other inventory facilities. Keeping items in inventory may provide numerous benefits, such as, for example, accommodating variations in customer demand and/or a manufacturer or distributor's ability to supply those items. Typically, holding some quantities of a particular product "in stock" may enable a merchant to make such product available to customers in a more consistent fashion.

However, storing inventory is not without cost. For example, providing a physical facility in which to store inventory presents recurring infrastructure costs directly attributable to the inventory items stored in the facility. Further, while items are in storage awaiting sale, debt or capital costs associated with acquiring the items may accumulate. Items being held in inventory may also depreciate, become obsolete, expire or spoil (e.g., in the case of perishable items), become damaged, or otherwise incur costs attributable to holding. When these various inventory holding costs are considered, having too much inventory may also be a concern, as accumulating costs may erode inventory value.

Determining optimal target inventory levels may require that a merchant accurately estimate market demand for an item during an upcoming planning period (and possibly beyond). Accurate inventory planning may also involve estimating lead times needed for replenishing the merchant's inventory of the item. Further complicating the inventory planning efforts, one or more other merchants ("hosted merchants") may in some instances offer the same item via the same sales channel, and thereby introduce additional variability into the particular merchant's forecasted inventory requirements vis-à-vis the estimated market demand. For example, a particular merchant ("host entity") having an established sales infrastructure may benefit by offering available sales channel resources to one or more hosted merchants. In this way, the hosted merchants may benefit from the host entity's established sales infrastructure, while the host entity offering the sales channel resources may benefit from fees or commissions paid by the hosted merchants for use of the host entity's established sales channel. However, estimating optimal target inventory levels for the host entity is complicated by the presence of the hosted merchants' product offerings, which may compete with the host entity's own product offering. Without accounting for the presence of the hosted merchants' competing offer within the same sales channel, traditional methods of inventory planning may significantly overestimate the host entity's target inventory levels.

Specific embodiments are shown by way of example in the drawings and will be described herein in detail. It should be understood, however, that the drawings and detailed description are not intended to limit the claims to the particular embodiments disclosed, even where only a single embodiment is described with respect to a particular feature. On the contrary, the intent is to cover all modifications, equivalents and alternatives falling within the spirit and scope of the present invention as defined by the appended claims. Examples of features provided in the disclosure are intended to be illustrative rather than restrictive unless stated otherwise.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to."

Reciting a component that is configured to perform one or more tasks is expressly intended not to invoke 35 U.S.C. §112, paragraph six, interpretation for that component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Various embodiments of systems and methods for inventory planning are disclosed. In some embodiments, systems and methods described herein may provide for adjustment of target inventory estimates based on the presence of offerings from hosted merchants. To this end, inventory reduction factors may be calculated to facilitate improved inventory planning.

Various ones of the present embodiments may include determining an estimated inventory requirement based on a demand forecast for items offered for sale by a host entity. An inventory reduction factor for the host entity may in some cases be determined based at least in part on an estimated ability of hosted merchants to fulfill demand for an item. An adjusted target inventory estimate may, in some instances, be calculated using the estimated inventory requirement and the determined inventory reduction factor of the item for the host entity. In various embodiments, a replenishment quantity of the item may be requested. The replenishment quantity may include a quantity determined in the adjusted target inventory estimate. The hosted merchants may be merchants offering the item for sale via the same sales channel through which the host entity offers the item for sale. In some embodiments, the hosted merchants may offer the item for sale via the host entity's network site (e.g., website).

As used herein, the term "merchant" includes any entity capable of conducting and/or fulfilling a sales transaction in response to an actual or expected order or request. Typically, a merchant may present or offer various products or items to its customers, as well as information about those items (e.g., availability and pricing information, product details, images, etc.) that facilitate a sale. For example, a retail enterprise that generally sells merchandise to end consumers (e.g., not generally intended for resale as new) may sell through an online, web-based channel that may include an online catalog or portal configured to display information about items or products, a web-based order entry system such as a virtual shopping cart or other system, a status tracking tool through which customers may track the status or progress of orders, a search engine, and any of a number of other features suitable for promoting and performing sales transactions. Merchants may also engage in transactions using other types of sales channels. For example, a merchant may employ a mail-order catalog channel, where customers may receive information about items or products via a mailed catalog and make orders using paper forms and/or via telephone. Additionally or alternatively, a merchant may have a physical (i.e., "brick-and-mortar") store, through which customers may receive information about products and order or purchase those products in person. In various cases, all or some portion of the aforementioned channels may be operated by the particular retail enterprise, or by a third party (e.g., another merchant).

As used herein, the term "customer" includes any purchaser (or potential purchaser) of an item or product, including entities other than an end consumer of a product sold. Therefore, manufacturers, distributors, retailers, and consumers may be "merchants" and/or "customers" depending upon their position within the supply chain. It is noted that in some embodiments, a unit of an item may be rented, leased or licensed to a customer under specific terms in exchange for revenue or other economic consideration.

As used herein, the term "sale" includes any suitable transaction involving an item resulting in either direct or indirect (e.g., imputed or tangential) revenue, and is intended to encompass rentals, leases, subscriptions, licenses, and other types of revenue models.

As used herein, the term "fulfillment center" includes any inventory storage facility such as, for example, warehouses, repositories, depositories, stockrooms, storehouses, distribution centers, material handling facilities, or the like.

Figure 1:
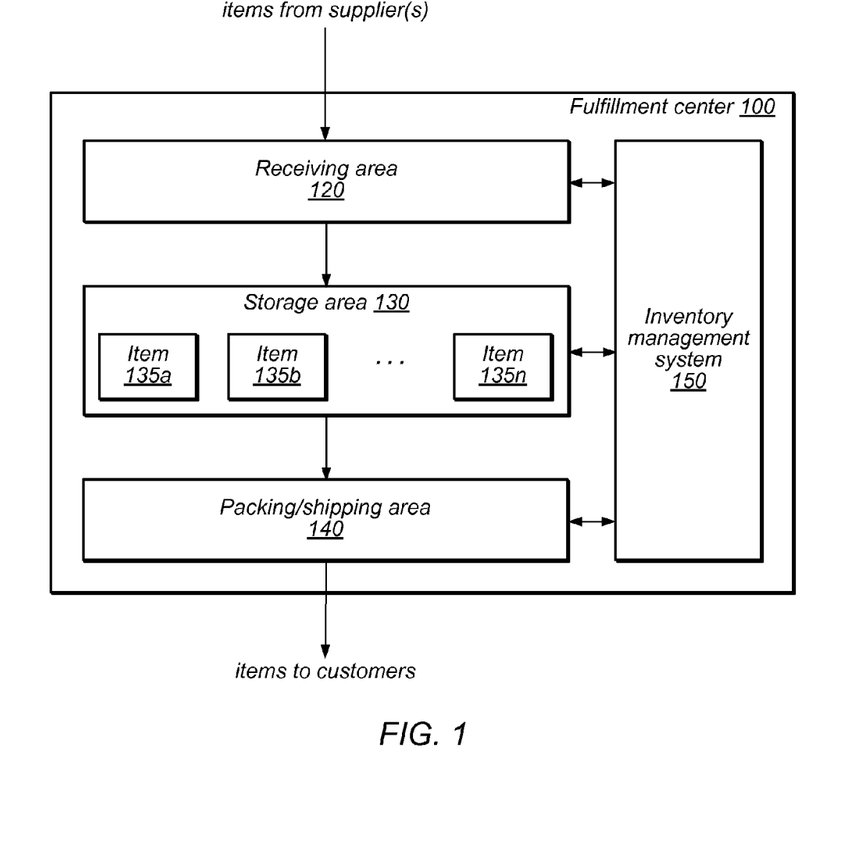
FIG. 1 is a block diagram of a fulfillment center according to some embodiments of the present disclosure.

In order to offer its customers a wider variety of items that are readily available for delivery, a merchant may store various quantities of such items within one or more fulfillment centers. An embodiment of one such fulfillment center is shown in FIG. 1. As illustrated, fulfillment center 100 includes receiving area 120, storage area 130 configured to store an arbitrary number of items or products 135a-n, and packing/shipping area 140. The arrangement of the various areas within the illustrated embodiment of fulfillment center 100 is depicted functionally rather than schematically. For example, in some embodiments, it is noted that multiple different receiving areas 120, storage areas 130, and packing/shipping areas 140 may be interspersed rather than segregated. Additionally, fulfillment center 100 includes an inventory management system 150 configured to interact with each of receiving area 120, storage area 130 and packing/shipping area 140.

Fulfillment center 100 may be configured to receive different kinds of items 135 from various suppliers, and to store them until a customer order specifying particular ones of items 135 is received. The particular items 135 may then be selected from storage and sent to the customer. The general flow of items through fulfillment center 100 is indicated using arrows. Specifically, in the illustrated embodiment, items 135 may be received from one or more suppliers, such as manufacturers, distributors, wholesalers, etc. at receiving area 120. In various embodiments, items 135 may include merchandise, commodities, perishables, or any suitable type of item depending on the nature of the merchant or enterprise that operates fulfillment center 100. Upon being received from a supplier at receiving area 120, items 135 may be prepared for storage. For example, in some embodiments items 135 may be unpacked or otherwise rearranged, and inventory management system 150 (which, as described below, may include one or more software applications executing on a computer system) may be updated to reflect the type, quantity, condition, cost or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135 such as bulk products, commodities, etc. may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within storage area 130. In some embodiments, like items 135 may be stored together in bins, on shelves or via other suitable storage mechanisms, such that all items 135 of a given kind are stored in one location. For example, items having a common Universal Product Code (UPC), Stock-Keeping Unit (SKU) code, or other designation (including proprietary designations) may be stored together. In other embodiments, like items 135 may be stored in different locations. For example, to optimize retrieval of certain items 135 having high turnover within a large physical facility, those items 135 may be stored in several different locations to reduce congestion that might occur at a single point of storage.

Management of items 135 stored as inventory within fulfillment center 100 often presents complex optimization issues. Generally speaking, the level of inventory of a given item 135 may affect the quality of service associated with providing the given item to a customer. Quality of service may encompass factors such as general availability and selection of items 135, timeliness of order completion, or any other factors relevant to a customer's perceived experience in conducting business relating to items 135. As an example of the interaction between inventory levels and quality of service, if a particular item 135 ordered by a customer is not in stock within fulfillment center 100, the customer may be forced to wait for delivery until that particular item 135 can be obtained, or the customer may cancel the order resulting in a lost sale. Consequently, keeping a number of units of items 135 on hand may assist in the timely fulfillment of orders and increase customer satisfaction. A larger inventory, for example, may more readily accommodate unexpected increases in customer demand.

On the other hand, various costs are typically associated with storing items 135 in fulfillment center 100 for any period of time. In some embodiments, holding a unit of an item 135 in storage within storage area 130 may incur incremental storage costs. For example, the cost of providing fulfillment center 100 in which items 135 may be stored may include recurring real estate costs (e.g., lease costs, debt service, etc.), personnel costs, facilities costs (e.g., utilities, maintenance, etc.) and any other costs associated with fulfillment center 100. In addition to storage costs, in some embodiments, holding a unit of an item 135 in storage may incur capital or economic costs related to the price paid to obtain the item. That is, once working capital or cash flow is committed to a unit of an item 135 (e.g., once that unit is paid for), that economic value is not available for other purposes; the committed value is "tied up" in the corresponding inventory. Other types of costs may also be associated with holding units of items 135 in storage. For example, in the ordinary course of operation of fulfillment center 100, items 135 may be subject to loss or damage due to accidents or mishaps. A rate of loss, or a corresponding rate of insurance against such loss, may be included within an overall cost of holding a unit of an item 135. Also, over time, items 135 may depreciate, expire, spoil or become obsolete, which may also be expressed as part of a cost of holding such items 135. At least in part to avoid or minimize some of these various costs, it is common practice for a merchant to fulfill existing orders for items 135 as soon as those orders are received and processed.

Inventory Planning

Figure 2:
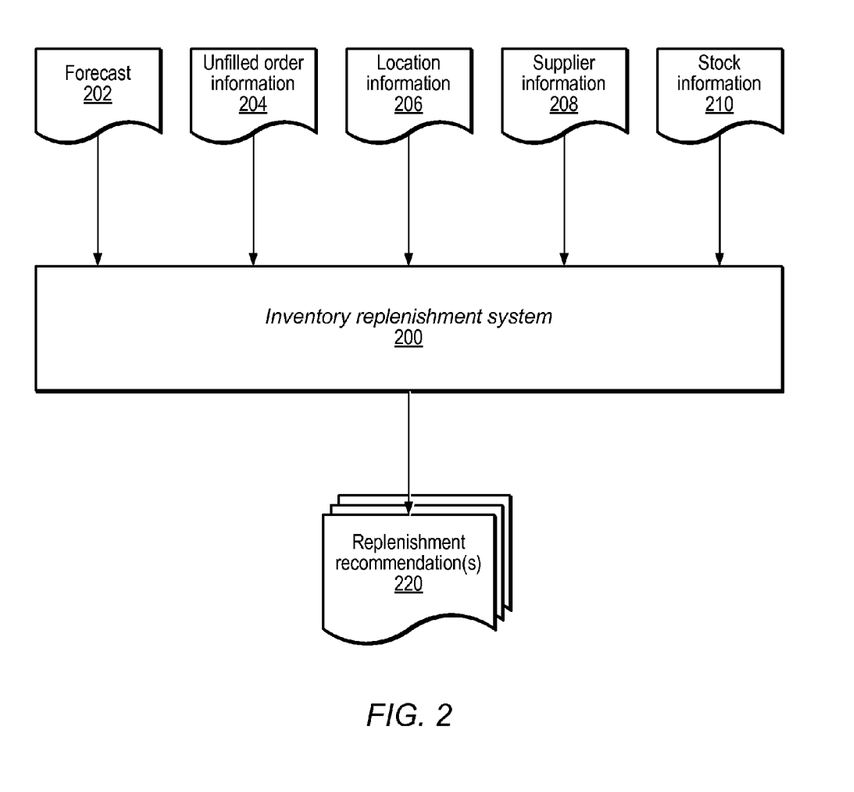
FIG. 2 is a block diagram of an inventory replenishment system configured to receive generate replenishment recommendations according to some embodiments.

FIG. 2 illustrates information flow in a inventory replenishment system according to one embodiment of the present disclosure. Embodiments of inventory replenishment system 200 may generate replenishment recommendation 220 based at least in part on various data, including one or more of forecasts 202, unfilled order information 204, location information 206 (e.g., replenishment lead time associated with shipping from a supplier), supplier information 208 (e.g., supplier cost, replenishment lead time associated with item availability from a supplier), and stock information 210 (e.g., current inventory). Note that forecast 202 may include forecasts or predictions of demand corresponding to one or more time periods. Replenishment recommendations 220 may indicate information such as, for example, items to be replenished, replenishment quantities for the items, locations to which the items are to be replenished, and particular sources within a distribution system from which the items are to be replenished.

Figure 3:
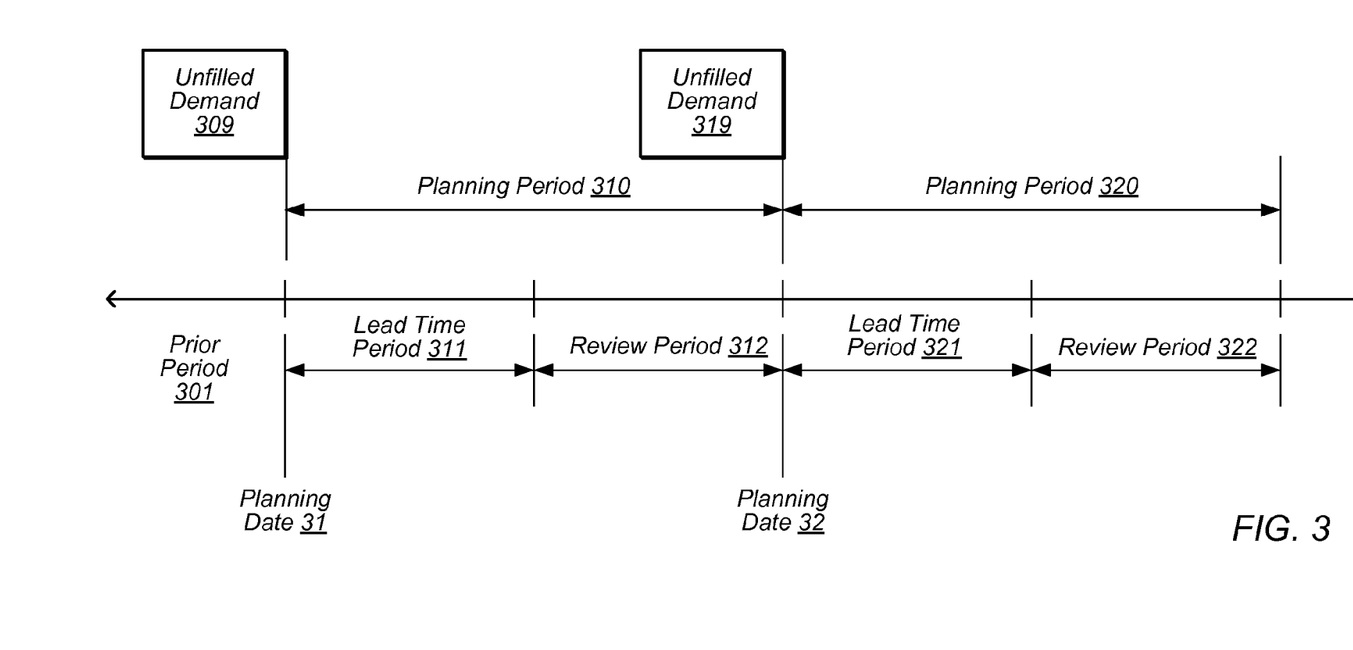
FIG. 3 depicts various exemplary time periods that may be associated with inventory planning as performed by some of the present embodiments.

As one example, an embodiment of inventory replenishment system 200 may generate replenishment recommendation 220 for a particular inventory item (e.g., one or more goods and/or services) based in part on a forecast 202 relating to an upcoming planning period. In various embodiments, forecast 202 and/or replenishment recommendation 220 may be specific to a particular one of a plurality of regional fulfillment centers having various regional forecasts for demand of the particular inventory item. Referring also to FIG. 3, the upcoming planning period may correspond to planning period 310 beginning at planning date 31 and ending at planning date 32. Planning period 310 may be subdivided for planning purposes into subset time periods, such as lead time period 311 and review period 312. Lead time period 311 may correspond to the total lead time associated with replenishing the inventory item, subsequent to the time that replenishment recommendation 220 is generated. For example, lead time period 311 may be based on a lead time associated with a supplier backlog (e.g., supplier information 208) of the inventory item and a lead time associated with delivery (e.g., location information 206) of the inventory item from the supplier to the inventory storage location (e.g., fulfillment center 100). Thus, lead time period 311 may correspond to the time from generations of replenishment recommendation 220 (planning date 31) until receipt of a corresponding replenishment supply. Similarly, lead time period 321 may correspond to a portion of planning period 320 between generation of a replenishment request at planning date 32 until receipt of a corresponding replenishment supply.

Continuing with the example of replenishment recommendation 220, review period 312 may correspond to the remaining portion of planning period 310, subsequent to lead time period 311. In other words, review period 312 may represent the time period after receipt of a replenishment supply requested at planning date 31, up to planning date 32 (which begins the next planning period). Thus, forecast 202 for planning period 310 may correspond to estimated customer demand for the inventory item during both lead time period 311 and review period 312. In some embodiments, inventory replenishment system 200 may separately generate forecasts for lead time period 311 and review period 312.

In particular embodiments, replenishment recommendation 220 may be further based on unfilled order information 204, which may include unfilled demand 309 at the time of planning date 31. For example, orders for the inventory item may have been accepted during prior period 301, but not yet fulfilled as of planning date 31 due to inventory shortages, logistics-related backlogs, or other reasons. Of these accepted but unfulfilled orders, unfilled demand 309 may correspond to the portion that has not yet been pulled from inventory as of planning date 31 (e.g., orders that are not work-in-progress, and not in transit). Thus, unfilled demand 309 may represent an existing commitment for the inventory item, originated prior to planning period 310, that will be satisfied from inventory (e.g., stock information 210) during planning period 310.

Therefore, inventory replenishment system 200 may generate replenishment recommendation 220 for planning period 310 that includes separate components respectively corresponding to unfilled demand 309, forecasted demand for lead time period 311, and forecasted demand for review period 312. Similarly, a replenishment recommendation corresponding to planning period 320, generated at planning date 32, may include portions corresponding to unfilled demand 319, lead time period 321, and review period 322. In some cases, it may be desirable to procure specific portions of the replenishment supply at an accelerated pace. For example, in instances where unfilled demand 309 is the result of inventory shortages, customer satisfaction may suffer if inventory replenishment cannot be accomplished in a timely manner. Therefore, if lead time period 311 is sufficiently long, accelerated shipping of supply to satisfy the inventory shortfall corresponding to unfilled demand 309 may be desirable. In some cases, drop shipping the item directly to the customer from the supplier may be appropriate. Similarly, if lead time period 311 is large and stock information 210 indicates that insufficient current inventory exists to meet estimated demand during lead time period 311, it may be desirable to arrange alternative arrangements to satisfy all or a portion of the estimated demand for lead time period 311 (e.g., accelerated supply to the fulfillment center, drop shipment to the customer).

In various embodiments, inventory management system 150 and inventory replenishment system 200 may be implemented as respective dedicated computer systems, or they may be implemented as computer-executable instructions and data that may be executed by one or more computer systems (e.g., as described in greater detail below with respect to FIG. 8). Inventory management system 150 and inventory replenishment system 200 are discussed and shown as separate systems in order to facilitate their description; however, in some embodiments, the functions of these systems may be integrated into and implemented by a single computer system or set of computer-executable instructions Sales Channels In some instances, it may be beneficial for a particular merchant ("host entity") to capitalize on sales and/or distribution channels that the host entity has established by offering use of the channels to other, hosted merchants. In some cases, these hosted merchants may compete, using the host entity's channels, with the host entity for sales of certain items to customers. For example, a host entity having a well-established sales infrastructure, such as a marketplace network site (e.g., marketplace website), may provide available sales channel resources to hosted merchants, including allowing the hosted merchants to offer the items for sale on the marketplace network site for a fee and/or commission. Hosted merchants may find such an arrangement to be beneficial for various reasons, such as, for example, exploitation of the host entity's name recognition, greater channel traffic, and savings of resources that would otherwise be required to establish a hosted merchant's sales channel. The host entity may find such an arrangement beneficial when revenue received from the hosted merchants justifies the introduced competition for specific items on the host entity's sales channel. Furthermore, the hosted merchants may bring additional value to the host entity's infrastructure. For example, a host entity's website may be enhanced by additional, non-competing items offered by the hosted merchants.

Figure 4:
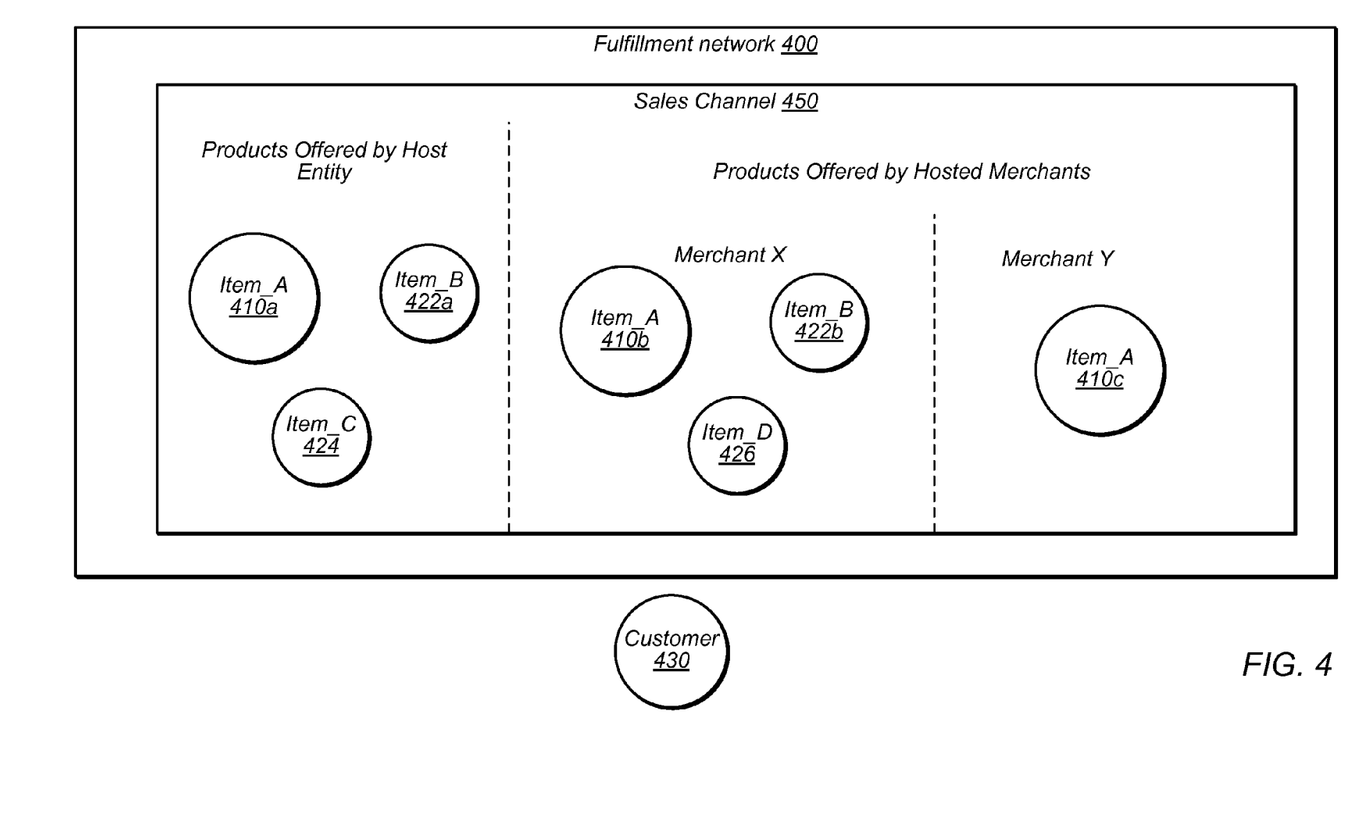
FIG. 4 is a block diagram of a fulfillment network according to various embodiments of the present disclosure. The depicted fulfillment network includes a sales channel operated by a host entity. Various items are offered for sale via the sales channel, including product offerings from the host entity and product offerings from hosted merchants.

FIG. 4 illustrates an exemplary fulfillment network in which a host entity's sales channel is also used by hosted merchants. As depicted, fulfillment network 400 may include sales channel 450 that is used by the host entity and two hosted merchants, Merchant X and Merchant Y. Sales channel 450 may include the host entity's marketplace website offering products for sale to customer 430 from the host entity, Merchant X, and Merchant Y. In this example, the host entity competes with both Merchant X and Merchant Y for sales of item_A over the host entity's website. Thus, item_A offering 410*b* and item_A offering 410*c* are competing offerings to item_A offering 410*a*. The host entity competes with only Merchant X for sales of item_B (item_B offering 422*a* and item_B offering 422*b*), and does not compete with either Merchant X or Merchant Y for sales of item_C (offering 424) over the website. Merchant X and Merchant Y may compensate the host entity for use of the website, and the host entity may also benefit from increased attractiveness of the website to customer 430 due to Merchant X's offering of item_D (offering 426), which is not offered for sale by the host entity.

However, the presence of the hosted merchants' competing offerings via the host entity's sales channel may complicate the host entity's inventory planning efforts. For example, it may be expected that some portion of customers that visit the host entity's sales channel will select to purchase a hosted merchant's competing offering. Of these purchases of competing offerings, some portion would likely have otherwise resulted in customer purchases of the host entity's offerings if not for the presence of the competing offerings. Thus, the competing offerings may be expected to result in lost sales by the host entity, which in turn may result in overly optimistic (overestimated) target inventory replenishment recommendations 220 to be generated by inventory replenishment system 200 unless the presence of the hosted merchants' competing offerings is considered.

In addition to introducing possible risk of overestimating a host entity's inventory needs, the presence of the competing items offered by hosted merchants over the host entity's sales channel may provide an opportunity to address the host entity's existing demand, such as demand corresponding to prior period 301 (e.g., unfilled demand) and/or lead time period 311 (e.g., forecasted demand prior to receipt of inventory replenishment) discussed above. For example, in cases where accelerated arrangements to satisfy existing or forecasted demand are desirable, shifting item sales from the host entity to one or more of the hosted merchants may be beneficial. In such situations, foregoing revenue associated with otherwise backlogged orders may be preferable to allowing a negative customer experience to persist. In some of these instances, a host entity's marketplace website may redirect customer orders that may otherwise have been fulfilled by the host entity to an appropriate hosted merchant that has been determined to be capable of filling the order with acceptable performance. Accordingly, the presence of the competing items may mitigate the risk of inventory shortfall, and therefore may in some cases allow a host entity to reduce the levels of safety stock (and resulting inventory costs) in the inventory planning models used for target inventory estimates.

Thus, the presence of the hosted merchants' competing items may in some instances impact the host entity by decreasing the host entity's sales of the item, and/or by providing a possible alternate path for addressing inventory shortfalls that the host entity may experience. Both of these possible effects suggest that benefits may be gained by adjusting the host entity's target inventory estimates to account for the presence of the competing offerings. Furthermore, both effects are related to the hosted merchants' presence and ability to fulfill demand for the item.

Determining Target Inventory Estimate

Figure 5:
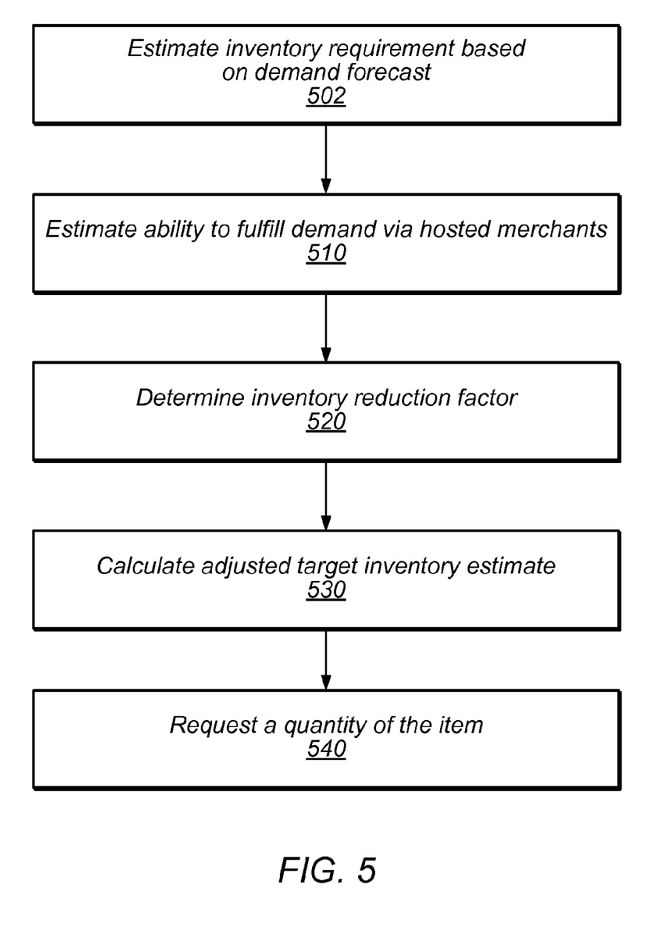
FIG. 5 is a flow diagram of a method for determining a target inventory estimate according to various embodiments of the present disclosure.

Turning now to FIG. 5, one embodiment of a method for determining a target inventory estimate based at least in part on the presence of hosted merchants is depicted. At 502, a preliminary estimate for inventory requirements may be determined by, for example, methods of inventory planning that do not account for the presence of hosted merchants. At 510, an ability of the hosted merchants to fulfill demand for a particular item is estimated. In some instances, this estimated ability may be determined based at least in part on data related to frequencies at which hosted merchants compete with the host entity via the host entity's sales channel for sales of the particular item. This competition frequency (which in some cases may be based on historical data, be modeled, or derived by some combination that includes both) may be indicative of the hosted merchants' ability to provide the particular item to a customer without negatively affecting the customer's experience (e.g., as a replacement if the host entity were unable to fulfill an order).

As one example, data collected from a host entity's marketplace website may provide statistics as to past occurrences customer navigation of the host entity's website. The collected data may in some cases reflect occurrences in which the customers evaluated the host entity's offering of a particular product, and occurrences in which the customer evaluated hosted merchants' offerings of the same product. Such data may be informative as to the relative quality of the hosted merchants' offering vis-à-vis the host entity's offerings. To this point, consider a website in which a product search or listing page presents a brief listing of various merchants' offerings of the particular product, along with related high level information such as price and shipping cost. Data relating to the percentage of visits in which customers navigated to a hosted merchant's listing of the product to gain further information (e.g., by selecting a hyperlink to gain further information as to the offering, or to place an order) may provide an indication of the attractiveness of that hosted merchant's offering, and therefore may also provide a useful indication of that hosted merchant's ability to suitably fulfill demand by proving a customer-acceptable replacement for the host entity's offering. In some cases, data such as a comparison of a hosted merchant's sales to the host entity's sales of the item via the website may provide an indication of the suitability of the hosted merchant's offering for fulfilling demand. In some instances, the proportion of hosted merchant sales to host entity's sales of the particular item to customers that evaluated both offerings (e.g., by navigating to pages specific to each offering, by selecting both products for comparison on the website, by adding and/or removing item offerings from a "shopping cart") may provide the indication of a hosted merchant's ability to suitably fulfill demand with acceptable level of customer satisfaction.

In some embodiments, determining a hosted merchant's ability to fulfill demand may include performing filtering based on information related to order fulfillment criteria (e.g., acceptable price, lead time, shipping price, return policy) and/or past performance data (e.g., actual delivery time, customer satisfaction-related data). In such a way, hosted merchant offerings that are determined to have an unacceptable probability of damaging customer satisfaction may be removed from consideration.

The number of hosted merchants that offer the particular product via the host entity's sales channel may also impact the aggregate ability of the hosted merchants to fulfill demand by providing additional potential sources for fulfilling demand.

At 520 of FIG. 5, an inventory reduction factor may be determined based at least in part on the estimated ability of the hosted merchants to fulfill demand for the particular item. As discussed above, the estimated ability to fulfill demand is calculated in some embodiments based on available data, and/or based on modeling. In some embodiments, that estimated ability to fulfill demand may not be calculated, but may instead be read (e.g., retrieved from a database, received as an input). In some embodiments, a threshold value may be implemented to restrict the amount of calculated reduction that may be realized as a safeguard to mitigate against unexpected inventory shortages due to, for example, modeling error, unexpected hosted merchant volatility, etc.

In one exemplary embodiment provided for illustrative purposes, an inventory reduction factor may be determined as follows:

(1) An estimated ability to satisfactorily fulfill demand ("Est. Ability") may be calculated based on historical data for customer interest in a hosted merchant's offering of an item ("affiliate selections"), which may in various instances include purchase of the item, placement of the item in a shopping cart, addition of the item to a saved list, etc., in all competitive cases where the host entity's offer of the item was also available ("competitive opportunities"):

$Est.$ Ability=(affiliate selections)/(competitive opportunities)

(2) An estimated amount of customer interest in the host entity's offering of the item that may be relinquished to the hosted merchant ("Est. Relinq. Int.") may be calculated based on the above-calculated Est. Ability and historical data for customer interest in the host entity's offering of the item in cases where the hosted merchant's offer was also available ("host selections (competition)"):

$Est.$ Relinq. $Int.=(Est.$ Ability$)\times$(host selections(competition))

(3) An inventory reduction factor ("Inv. Reduction") may be calculated based on the above-calculated Est. Relinq. Int. and historical data for the total amount of customer interest in the host entity's offering of the item, inclusive of cases where the hosted merchant's offer was not available ("host selections (all)"):

$Inv.$ Reduction=$(Est.$ Relinq. $Int.)$/(host selections(all))

Continuing with FIG. 5, an adjusted target inventory estimate may be calculated at 520, based at least in part on applying the above-discussed inventory reduction factor to a forecasted target inventory quantity (e.g., a target quantity that has been determined using only prior existing methods). In such as way, a previous forecast for target inventory levels may be adjusted to account for hosted merchant presence, thereby facilitating generation of improved inventory replenishment recommendations that may be requested by some embodiments at 540.

In various embodiments, the inventory reduction factor may be applied to a forecasted target inventory quantity corresponding to an entire planning period. In other embodiments, the inventory reduction factor may be applied to a forecasted target inventory quantity corresponding to one or more portions of a planning period, but not to the entire planning period. For example, referring again to FIG. 3, an inventory reduction factor may be used to calculate an adjusted target inventory estimate of demand for lead time period 311. During periods when the host entity may be experiencing an inventory shortage, it may be desirable to push forecasted sales corresponding to lead time period 311 to a hosted vendor in order to assure quick fulfillment, thereby avoiding possible delay-related risks in customer satisfaction. However, in some cases it may be undesirable to push unfilled demand 309 to a hosted merchant due to, for example, accounting reasons (e.g., revenue relating to unfilled demand 309 having been previously reported by the host entity).

Figure 6A:
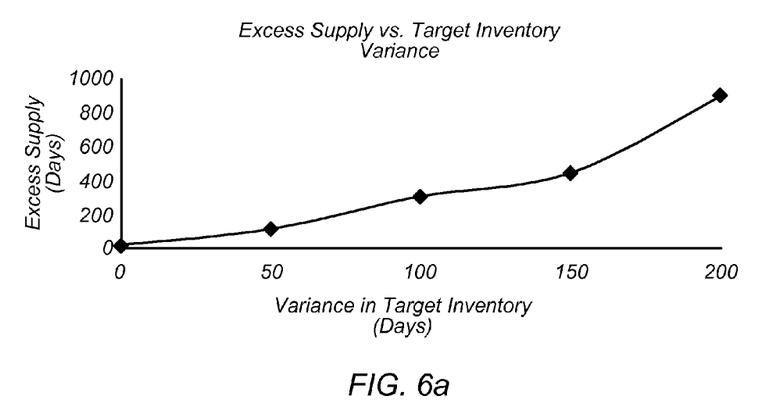
FIGS. 6a-6b are graphs illustrating data obtained from historical inventory planning data. The graphs illustrate observed possible relationships between variance in target inventory and resulting excess supply, as well as possible relationships between the presence of hosted merchants and resulting variance in a host entity's target inventory.
Figure 6B:
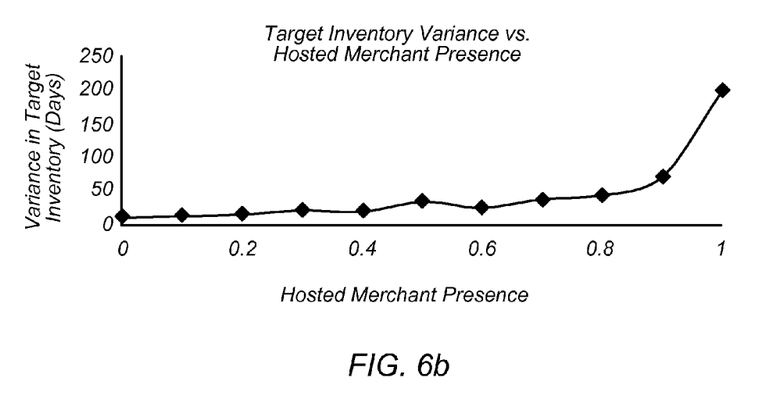

FIGS. 6a and 6b present graphs illustrating examples of observed relationships that may contribute to various embodiments of the present disclosure. The graphs show observed possible relationships between variance in target inventory and resulting excess supply, as well as possible relationships between the presence of hosted merchants and resulting variance in target inventory. The graphs are representative of data obtained over a period of several planning periods, relating to a limited sample set of SKUs.

FIG. 6a illustrates that fluctuations in target inventory levels may lead to excessive amounts of actual supply in inventory. Note that the excess amount of actual supply in inventory is a result of the variance in target inventory level (e.g., fluctuations in the estimated target level), and is not necessarily caused by regular variations in demand. Accordingly, opportunities to reduce the variance in target inventory levels provide potential savings by reducing the actual amount of excess inventory.

Turning to FIG. 6b, Hosted Merchant Presence is the ratio of total sales of a particular item (e.g., sales related to a particular SKU) accounted for by hosted merchants. It was observed that higher Hosted Merchant Presence led to higher variation in target inventory levels. It appears that demand interaction with hosted merchants may have caused forecasts to become more volatile, thereby leading to increased target inventory levels that included more safety stock than was actually warranted. Accordingly, reducing target inventory levels in cases where items are associated with a high hosted merchant presence may be beneficial, and may reduce the variance in target inventory level.

Based on observed effects of various factors on target inventory variance and excess inventory supply levels, characteristics depicted in FIGS. 7a-7d were developed for use in some of the present embodiments to facilitate improvement of inventory replenishment recommendations by optimizing calculated inventory reduction factors.

Figure 7A:
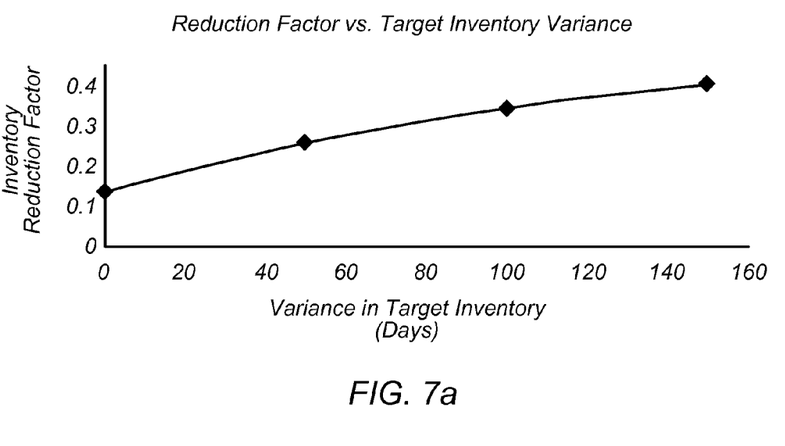
FIGS. 7a-7d are graphs presenting data representative of characteristics implemented in one exemplary embodiment of the present disclosure.

As shown in FIG. 7a, in certain embodiments, higher inventory reduction factors (corresponding to greater reduction in the adjusted target inventory estimate) may be warranted as variance in target inventory increases. Implementation of such embodiments may serve to smooth out variations caused by hosted merchant presence.

Figure 7B:
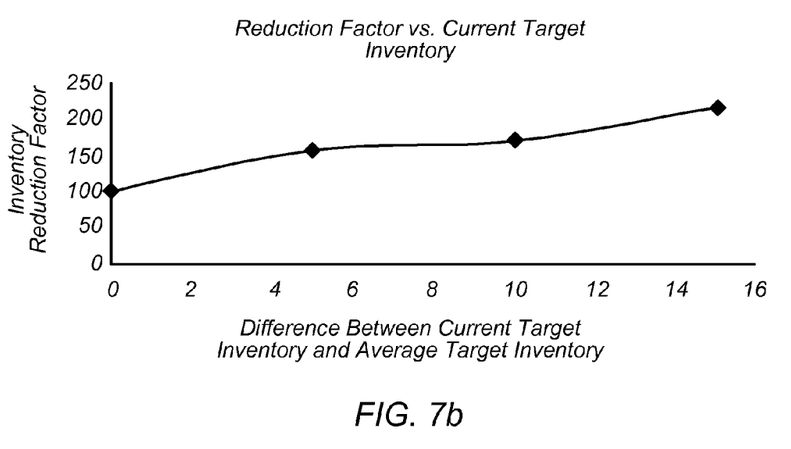
Figure 7C:
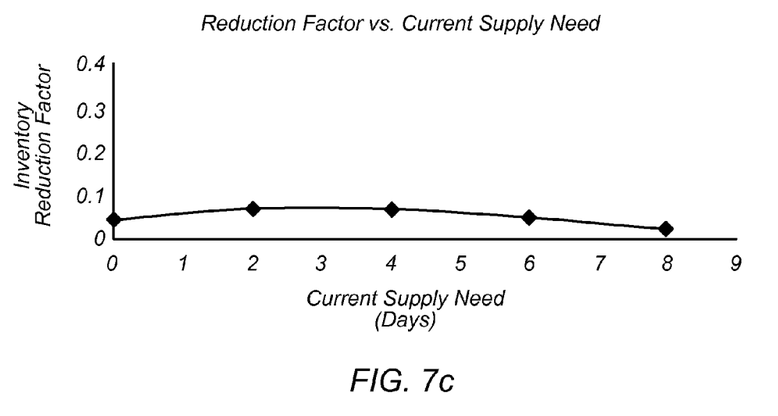

FIGS. 7b and 7c illustrate that some embodiments may achieve improved performance by adjusting inventory reduction factors based on the current target inventory. As shown in FIG. 7b, high current target inventory forecast levels (e.g., near historical max levels) may be indicative of target inventory variance being high, which may be a product of affiliate merchant presence. However, as shown in FIG. 7c, it may be appropriate to reduce (or eliminate) the inventory reduction factor in cases where the current supply in inventory is below the current target, thereby mitigating risks of inventory shortage.

Figure 7D:
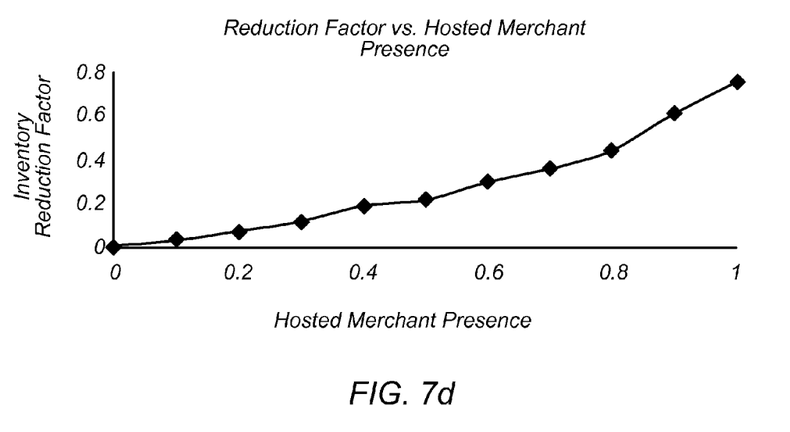

FIG. 7d illustrates that various embodiments may compensate for possible effects of hosted merchant presence on variance in target inventory levels and excess inventory supply by increasing the inventory reduction factor as the hosted merchant presence increases.

Particular embodiments of the present disclosure may employ all of the principles illustrated in FIGS. 7a-d. Other embodiments may employ only a subset of these principles. Some embodiments may employ other principles in addition to, or in place of the illustrated principles.

Figure 8:
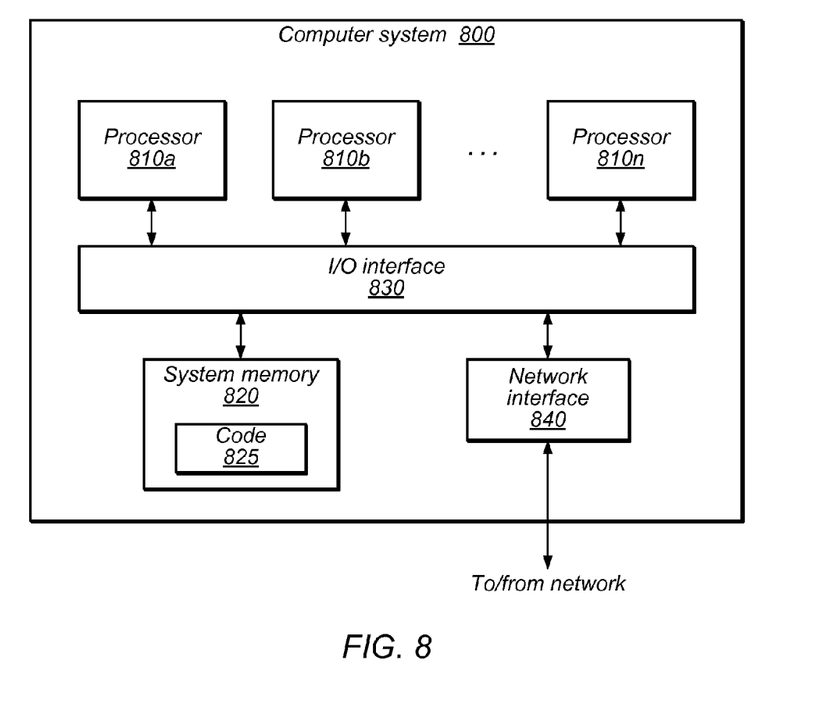
FIG. 8 is a block diagram illustrating a computer system configured to implement a method for determining a target inventory estimate according to various embodiments of the present disclosure.

An embodiment of a computer system including computer-accessible media is illustrated in FIG. 8. As illustrated, computer system 800 includes one or more processors 810 coupled to a system memory 820 via an input/output (I/O) interface 830. Computer system 800 further includes a network interface 840 coupled to I/O interface 830. In some embodiments, inventory replenishment system 200 may be implemented using a single instance of computer system 800, while in other embodiments multiple such systems may be configured to host different portions or instances of a planning system. Moreover, in some embodiments, some data sources or services (e.g., forecast management services) may be implemented via instances of computer system 800 that are distinct from those instances implementing other data sources or services (e.g., supplier lead time management services).

In various embodiments computer system 800 may be a single processor system including one processor 810, or a multiprocessor system including several processors 810 (e.g., two, four, eight, or another suitable number). Processors 810 may be any suitable processor capable of executing instructions. For example, in various embodiments processors 810 may be a general-purpose or embedded processor implementing any of a variety of instruction set architectures (ISAs), such as the x96, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by process 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 820 as code 825.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network, such as other computer systems, for example. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media—e.g., disk or CD/DVD-ROM coupled to computer system 800 via I/O interface 830. A computer-accessible medium may also include any volatile or non-volatile media such as RAM (e.g., SDRAM, DDR SDRAM, RDRAM, SRAM, etc.), ROM, etc, that may be included in some embodiments of computer system 800 as system memory 820 or another type of memory. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 840.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:
    determining, by a computer system, an estimated inventory requirement based on a demand forecast for an item offered for sale by a host entity, wherein the estimated inventory requirement corresponds to a first time period;
    determining, by a computer system, an inventory reduction factor for the host entity based at least in part on an estimated ability to fulfill demand for the item via one or more hosted merchants, wherein the host entity and the one or more hosted merchants each offer the item for sale via a network site operated by the host entity;
    calculating, by a computer system, an adjusted target inventory estimate for the host entity based at least in part on the estimated inventory requirement and the inventory reduction factor; and
    requesting a quantity of the item to replenish inventory of the host entity, wherein the requested quantity comprises the adjusted target inventory estimate.

2. The method of claim 1, wherein the requested quantity of the item further comprises an unfilled demand for the item at the beginning of the first time period.

3. The method of claim 2, wherein the requested quantity of the item further comprises:
    an additional target inventory estimate for the host entity based on a forecast for demand of the item during a second time period;
    wherein the first time period corresponds to a portion of an inventory planning period corresponding to a lead time required to receive inventory replenishment of the item, and wherein the second period of time corresponds to a portion of the planning period extending from the end of the first time period to the end of the planning period.

4. The method of claim 1, further comprising:
    directing, at the network site operated by the host entity, one or more sales of the item to a particular one of the one or more hosted merchants, wherein the directing is in response to a level of available quantity of the item in the inventory of the host entity.

5. A system, comprising:
    one or more processors; and
    memory, coupled to the one or more processors, having stored thereon instructions executable by the system to cause the system to perform operations comprising:
        determining an inventory reduction factor for a host entity's inventory of an item, wherein the inventory reduction factor is based at least in part on an estimated ability of one or more hosted merchants to fulfill demand received by the host entity for the item, wherein the host entity and the one or more hosted merchants offer the item for trade via the host entity's sales channel; and
        determining an adjusted target inventory estimate for the host entity based at least in part on a first target inventory quantity for the item and the inventory reduction factor, wherein the first target inventory quantity corresponds to a first time period.

6. The system of claim 5, wherein the operations further comprise:
    requesting an inventory replenishment quantity of the item, wherein the inventory replenishment quantity is based at least in part on:
        the adjusted target inventory estimate for the item;
        a currently unfilled demand for the item; and
        a second target inventory quantity for the item, the second target inventory quantity corresponding to forecasted demand over a second time period for the item from the host entity;
    wherein the first time period corresponds to a portion of an inventory planning period corresponding to a lead time required to receive the replenishment quantity of the item, and wherein the second time period corresponds to a portion of the planning period extending from the end of the first time period to the end of the planning period.

7. The system of claim 5, further comprising:
    determining the estimated ability to fulfill the demand for the item via the one or more hosted merchants.

8. The system of claim 7, wherein the determining the estimated ability to fulfill the demand is based at least in part on an approximation of a frequency at which the host entity and ones of the one or more merchants compete at the host entity's sales channel for demand of the item.

9. The system of claim 7, wherein the determining the estimated ability to fulfill the demand includes filtering information based at least in part on order fulfillment ability of ones of the one or more hosted merchants.

10. The system of claim 9, wherein the order fulfillment ability includes lead time for delivery to a consumer.

11. The system of claim 7, wherein the determining the estimated ability to fulfill the demand is further based at least in part on a number of the one or more hosted merchants offering the item for trade via the host entity-controlled sales channel.

12. The system of claim 5, wherein the inventory reduction factor is further based at least in part on a determination of a variance in the first target inventory quantity over a plurality of previous planning periods.

13. The system of claim 5, wherein the inventory reduction factor is further based at least in part on a difference between a current inventory level of the item and the first target inventory quantity.

14. The system of claim 5, wherein the operations further comprise:
   redirecting, from the host entity to a particular one of the one or more hosted merchants at the host entity's sales channel, one or more sales of the item;
   wherein the redirecting is in response to an available quantity in the host entity's inventory of the item.

15. An article of manufacture comprising a non-transitory computer-readable storage medium having instructions stored thereon that, responsive to execution by a computer system, cause the computer system to perform operations comprising:
   determining an inventory reduction factor for an item offered for sale by a host entity, wherein the determining is based at least in part on an estimated ability to fulfill, via one or more hosted merchants, the host entity's received demand for the item, wherein the host entity and the one or more hosted merchants offer the item for sale via the host entity's sales channel;
   adjusting an estimated inventory requirement, of the host entity for the item over a first time period, to produce an adjusted target inventory estimate for the first time period, wherein the adjusting is based at least in part on the inventory reduction factor; and
   calculating a replenishment quantity of the item for the host entity, wherein the replenishment quantity comprises the adjusted target inventory estimate.

16. The article of manufacture of claim 15, wherein the host entity offers the item for sale from inventory controlled by the host entity, and wherein each of the one or more hosted merchants offers the item for sale from inventory controlled by respective one or more hosted merchants.

17. The article of manufacture of claim 15, wherein the host entity's sales channel includes a marketplace network site operated by the host entity, and wherein the host entity and the one or more hosted merchants offer the item for sale via the marketplace network site.

18. The article of manufacture of claim 15, wherein the operations further comprise:
   determining the estimated ability to fulfill, via the one or more hosted merchants, the host entity's received demand for the item;
   wherein the determining the estimated ability to fulfill is based at least in part on an approximation of a frequency at which the host entity and ones of the one or more hosted merchants compete at the host entity's sales channel for demand of the item.

19. The article of manufacture of claim 15, wherein the determining the inventory reduction factor is further based at least in part on a determination of a variance in the estimated inventory requirement of the host entity for the item over a plurality of previous planning periods.

20. The article of manufacture of claim 15, wherein the adjusting the estimated inventory requirement of the host entity includes maintaining a minimum threshold value for the adjusted target inventory estimate for the first time period.

21. The article of manufacture of claim 15,
   wherein the host entity operates a plurality of regional fulfillment centers respectively holding inventory of the item; and
   wherein the adjusted target inventory estimate is specific to a particular one of the plurality of regional fulfillment centers.

\* \* \* \* \*